United States Patent [19]

Stempin et al.

[11] Patent Number: 5,591,683
[45] Date of Patent: Jan. 7, 1997

[54] PHASE-SEPARATED, NON-CRYSTALLINE OPAL GLASSES

[75] Inventors: John L. Stempin, Beaver Dams; Dale R. Wexell, Corning, both of N.Y.

[73] Assignee: Corning Incorporated, Corning, N.Y.

[21] Appl. No.: 563,877

[22] Filed: Nov. 28, 1995

[51] Int. Cl.$^6$ .............................. C03C 1/04; C03C 3/118; C03C 3/087
[52] U.S. Cl. ............................... 501/32; 501/59; 501/66; 501/69; 501/70
[58] Field of Search ............................... 501/32, 63, 66, 501/69, 70, 59

[56] References Cited

U.S. PATENT DOCUMENTS

| | | | |
|---|---|---|---|
| 2,559,805 | 7/1951 | Stookey | 501/63 |
| 2,921,860 | 1/1960 | Stookey | 501/59 |
| 3,498,801 | 3/1970 | Keul | 501/70 |
| 3,498,810 | 3/1970 | Tacharner | 106/124 |
| 3,506,464 | 4/1970 | Baak et al. | 501/63 |
| 3,661,601 | 5/1972 | Dumbaugh et al. | 501/59 |
| 3,723,144 | 3/1973 | Flannery et al. | 501/65 |
| 3,728,139 | 4/1973 | Carrier et al. | 501/67 |
| 4,298,390 | 11/1981 | Flannery et al. | 501/32 |
| 4,309,218 | 1/1982 | Flannery et al. | 501/32 |
| 4,309,219 | 1/1983 | Flannery et al. | 501/32 |
| 4,536,480 | 8/1985 | Flannery et al. | 501/32 |

*Primary Examiner*—Mark L. Bell
*Assistant Examiner*—Louis M. Troilo
*Attorney, Agent, or Firm*—Angela N. Nwaneri; Milton M. Peterson

[57] ABSTRACT

This invention is directed to the production of spontaneous essentially non-crystalline opal glasses exhibiting a very dense, milky-white appearance and excellent resistance to weathering and attack by alkaline detergents consisting essentially, expressed in weight percent on the on the basis, of 1.9–3.6% $K_2O$, 4.2–7.3% $Na_2O$, 0.2–3% $Li_2O$, 0–1.2% MgO, 0–4.9% CaO, 0–12.5% BaO, 0–0.1% NiO, 0.4–4% ZnO, 5.3–9.6% $B_2O_3$, 8.8–13.5% $Al_2O_3$, 57.2–64.4% $SiO_2$, and 1.0–2.2% F., where the sum of (MgO+CaO+BaO) is preferably in the range of 4.5–12.5%.

4 Claims, No Drawings

1

PHASE-SEPARATED, NON-CRYSTALLINE OPAL GLASSES

BACKGROUND OF THE INVENTION

This application claims the benefit of U.S. application Ser. No. 60/006,729 express mailed Nov. 14, 1995, entitled PHASE-SEPARATED, NON-CRYSTALLINE OPAL GLASSES, by John L. Stempin and Dale R. Wexell.

The invention is directed to the production of spontaneous opal glasses which contain amorphous particles as the opacifying or light-diffusing phase. The glasses are phase separated, but non-crystalline, exhibit a very dense, milky-white appearance (unless colorants are added thereto), and strongly resist weathering and attack by acids and alkaline detergents, thereby recommending their utility for culinary ware and tableware.

This type of glass has been termed an immiscible opal, i.e., an opal glass wherein the opacifying phase is a glass which is insoluble in the basic glass matrix. Numerous attempts have been pursued in the past to develop an example of this type of opal glass which combines good chemical durability and resistance to weathering with a dense, white opacity.

Several attempts have been made in the past to develop opal glasses having the above properties. Examples of such glasses are disclosed in U.S. Pat. Nos. 4,309,219 (herein incorporated by reference); 3,498,810; 3,506,464; 3,661,601; 3,723, 144; and 3,728,139.

There continues to be a need for opal glasses demonstrating dense opacity and good chemical durability and resistance to weathering, as well as good aesthetic appearance. Accordingly, the object of the present invention is to develop an improved opal glass, exhibiting excellent opacity and good chemical durability.

SUMMARY OF THE INVENTION

Briefly, the present invention relates to a spontaneous, essentially non-crystalline opal glass exhibiting a very dense, milky-white appearance, a softening point in excess of 750° C., coefficients of thermal expansion (25°–300° C.) over the range of about 65–85×10$^{-7}$/°C., a density of at least 2.4, an opal liquidus higher than 1200° C., consisting essentially, expressed in terms of weight percent on the oxide basis as calculated from the batch, of 1.9–3.6% $K_2O$, 4.2–7.3% $Na_2O$, 0–3% $Li_2O$, 0–1.2% MgO, 0–4.9% CaO, 0–12.5% BaO, 0–0.1% NiO, 5.3–9.6% $B_2O_3$, 0.4–4% ZnO, 8.8–13.5% $Al_2O_3$ 57.2–64.4% $SiO_2$, 1–6% $P_2O_5$, and 1.0–2.2% F., with the sum of (MgO+CaO+BaO) being preferably in the range of 4.5 to 12.5%; and $Li_2O$ being preferably, at least 0.2%.

DETAILED DESCRIPTION OF THE INVENTION

The present invention is designed to produce spontaneous, essentially non-crystalline opal glasses especially suitable for culinary and table ware exhibiting a very dense, milky-white appearance in thin cross section and excellent resistance to attack by alkaline solutions, particularly hot aqueous detergent solutions. The glasses are operable in microwave applications because of their non-crystalline nature and remain non-crystalline even after heat treatments to the annealing and softening points thereof. Hence, the glass articles can be air tempered without the development of crystallization therein. Finally, the glasses demonstrate coefficients of thermal expansion (25°–300° C.) over the range of about 65–85×10$^{-7}$/° C., density of at least 2.4 g/cm$^3$ and softening points above 750° C. This latter feature allows the use of high temperature decorating frits where desired. The emulsion or opal liquidus greater than 1200° C., preferably greater than 1300° C.

Glasses which satisfy those conditions and which are capable of being melted and formed utilizing techniques conventional in the glass art, consist essentially, expressed in weight percent on the oxide basis, of 1.9–3.6% $K_2O$, 4.2–7.3% $Na_2O$, 0–3.0% $Li_2O$, 0–1.2% MgO, 0–4.9% CaO, 0–12.5% BaO, 0–0.1% NiO, 0.4–4% ZnO, 5.3–9.6% $B_2O_3$, 8.8–13.5% $Al_2O_3$, 57.2–64.4% $SiO_2$, 1–6% $P_2O_5$, and 1.0–2.2% F. Preferably, the sum of (MgO+CaO+BaO) is in the range of 4.5–12.5 weight percent; and most preferably, $Li_2O$ is at least 0.2 weight percent.

We have found that the best non-crystalline opal glass for the invention is a fluorophosphate-borosilicate opal glass having 0.2–3% $Li_2O$. The improved opal glass of the invention exhibits increased opacity, less quench sensitivity, and uniform tintability. The addition of $Li_2O$ results in an opal glass having an increased phase separation which in turn increases the opacity of the glass. With $Li_2O$ present, the phase separation consists of many more small particles in contrast to a fewer number but larger particles without $Li_2O$ present. This increase in opacity is a result of two effects: an increase in emulsion liquidus temperature which produces greater opacity in glasses, and the generation of a separated phase which has more smaller size particles. A key aspect of the invention is that we have found that the present composition yields increased emulsion temperature and consequently, high opacity without undesirable side effects such as gross phase separation and "mother-of-pearl" surface finish.

As a result of the high emulsion temperatures of the present opal glass compositions, we have found that the glasses can be processed by methods such as spinning which results in better opacity than observed in pressed glass products. Generally, spun ware exhibit increased density or opacity over pressed ware of the same thickness. Spinning also produces glossier finish than pressed glass. This is a key aspect of the present invention. Because of the higher emulsion temperature of the inventive glass, the glass exhibits the desired opacity while having appropriate viscosity for spinning.

The necessary components for the development of the light-diffusing, liquid-liquid phase separation comprise 1.0–2,2% F., 1–6% $P_2O_5$, and 5.3–9.6% $B_2O_3$. Interspersed phosphate-rich and fluorine-rich non-crystalline glass phases occur when the $B_2O_3$, $P_2O_5$, and F are combined with the other oxides in the inventive system. The temperature of the working viscosity (10$^3$–10$^4$ poises) for these glasses is about 1360° C. or less and can be adjusted by varying the quantities of $B_2O_3$, $Na_2O$, $K_2O$, and F in the composition. $B_2O_3$ encourages the constituents of the inventive glasses to form interspersed amorphous phases manifesting substantial differences in refractive index. These differences provide the very dense white opacity of the opals.

A concentration of F less than about 1.0%, leads to unacceptably high viscosity and the resulting opal glass will commonly contain a crystalline phosphate phase. As the F level is increased, the softening point and working temperature of the glass are significantly reduced. For the present opal glass, we have found that amounts off greater than about 2.2% do not improve phase separation noticeably and the softening point is reduced to such an extent that decorating with durable, high temperature enamels becomes impossible. Moreover, excessive quantities of F lead to severe mold corrosion and air pollution problems because of the volatility of fluorine compounds during melting of the batch materials. The most preferred level of F is about 1.7%.

The alkaline earth metal oxides are utilized to enhance opacity. Those materials preferentially enter into the glassy matrix of one of the amorphous phases and assist in developing liquid phases with significantly dissimilar refractive indices. High concentrations of CaO can have a very deleterious effect upon the acid and alkali durability exhibited by the glasses since such lead to the formation of a non-durable, amorphous phase in the base glass or by causing extensive surface crystallization on the glass. Consequently, the level of CaO will be held below about 5%.

MgO may be present in relatively small amounts to intensify opacity or to adjust physical properties, but such additions must be carefully controlled to avoid adversely altering other physical properties of the glass to any substantial extent and/or initiating gross phase separation.

BaO is unique among the alkaline earth metal oxides in not only enhancing opacity but also exerting a positive effect upon the acid and alkaline durability of the glasses. Because $Al_2O_3$, BaO, and $SIO_2$ improve the chemical durability of the glass, the preferred glasses will contain about 66–90% total of those materials. BaO demonstrates the side effects of lowering the softening point and increasing the density of the glass. Furthermore, at high levels of $P_2O_5$, large concentrations of BaO hazard gross phase separation.

$Al_2O_3$ is beneficial in stiffening the glass for forming purposes increasing the chemical durability and improving the decorability thereof. It is believed that $Al_2O_3$ also acts to densify the glassy matrix, thereby preventing any gross migration of Na+ and F-ions to the surface. Whereas $Al_2O_3$ plays a vital role in achieving excellent resistance to acid and alkali attack, more than about 14% tends to flatten the viscosity of the glass which, in turn, causes an undesirable increase in the working temperature of the glass.

The level of $Na_2O$ is carefully regulated in order to optimize the chemical and physical properties of the glass. $K_2O$ behaves as a fluxing agent and, in conjunction with the other components, provides chemically durable, non-weathering glasses.

ZnO is beneficial in regulating the size of the separated phosphate rich phase in the glass. It is known that ZnO appears in both the bulk phase and the separated phase and alters the surface tension of the separated phase.

We have found that the incorporation of up to 4 wt. % ZnO to compositions similar to those disclosed in U.S. Pat. No. 4,309,219 can substantially alter the degree of separation of the secondary phase in the formation of the opal glass. The presence of ZnO significantly lowers the high temperature emulsion liquidus and thereby results in the formation of a separated phase with smaller droplets when no ZnO is present. In effect, the presence of ZnO at a minimum level of about 0.4% increases the surface tension of the separated phase thereby allowing the formation of the smaller spherical amorphous moities. The amount of ZnO required to be present depends on the total $Li_2O$ content, the speed of ware manufacturing, and the forming temperatures. The addition of ZnO is most beneficial when the $Li_2O$ content is greater than 0.2% and the forming temperatures are below 1340° C.

Scanning electron microscopy and x-ray emission data indicate that the zinc enters the separated phase and is also present in the bulk glassy phase. Whereas the mechanism of that action has not been fully elucidated, it is believed that the presence of ZnO causes the development of a separated amorphous phase with a larger population of smaller particles. Increasing the surface tension of the separated phase indicates that it is more difficult for the smaller particles to combine to form larger particles which might result in break sources on heating of the glass and rapid cooling in tempering.

The presence of ZnO, if appropriate for a given composition, can offset the effects of a large population of particles derived from a glass containing $Li_2O$ The addition of $Li_2O$ above 0.2% significantly increases the emulsion liquidus of the glass and increases the range over which the separated phase can form. As the lithium glass resides longer in the emulsion range, there is a greater tendency to form larger amorphous separated phase particles which can result in breakage of ware. The addition of ZnO serves to mitigate or eliminate this phenomenon. In short, ZnO in the opal glass compositions can essentially eliminate the undesirable large separated phase particles which can result in ware breakage in thermal upshock.

DESCRIPTION OF PREFERRED EMBODIMENTS

Table I records glass compositions, expressed in terms of parts by weight as calculated from the batch, illustrating the inventive products. Because the sum of the tabulated components totals or approximately totals 100, for all practical purposes the reported figures may be deemed to represent the compositions in terms of weight percent. Inasmuch as it is not known with which cation(s) the fluoride is combined, it is merely recited as F in accordance with conventional glass analysis practice.

The actual batch ingredients may comprise any materials, either the oxides or other compounds, which, when melted together, will be converted into the desired oxide in the proper proportions. Although the following description is drawn to laboratory scale melting and forming, it will be appreciated that the illustrative compositions could also be utilized in large scale melting units.

The batch ingredients were compounded, tumble mixed to aid in securing a homogeneous melt, and deposited into platinum crucibles. The crucibles were introduced into an electrically-heated furnace operating at 1450° C.–1550° C. and the batches melted for four hours. The melts were cast into steel molds to produce slabs having dimensions of about 6"×6"×0.5" or manually pressed into discs of about 3–4" in diameter and about 0.125–0.25" in thickness. Pressing of the discs was undertaken to simulate roughly the quick quenching of the glass taking place during commercial automatic pressing operations. The glass slabs were transferred to a furnace operating at about the annealing temperature, that temperature sustained for about one hour, and then cooled to room temperature retained within the furnace (approximately 30° C./hour).

The annealed slabs demonstrated no translucency. The density of opacification exhibited by the pressed discs varied in accordance with the proximity of the forming temperature utilized to the emulsification temperature or opal liquidus of the glass. Most preferably to ensure dense opacity, the pressing temperature will not be in excess of about 80° C. above the emulsification temperature.

TABLE I

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| $SiO_2$ | 60.3 | 60.4 | 58.7 | 60.2 | 61.7 | 59.1 | 60.0 | 56.4 | 60.2 | 61.0 | 61.3 | 58.9 | 62.1 | 61.5 | 61.2 | 62.6 |
| $Al_2O_3$ | 8.9 | 8.9 | 8.9 | 8.6 | 8.8 | 8.6 | 8.9 | 8.3 | 8.6 | 9.0 | 8.9 | 8.9 | 8.8 | 9.6 | 9.2 | 9.9 |
| $Na_2O$ | 7.2 | 5.4 | 5.4 | 5.3 | 5.3 | 5.3 | 4.5 | 4.2 | 5.3 | 5.5 | 6.0 | 5.8 | 5.0 | 5.8 | 7.2 | 5.7 |
| CaO | 1.6 | 3.3 | 4.9 | | 0.8 | | 1.6 | | | 0.8 | 1.6 | | 0.8 | 0.8 | 1.7 | 0.8 |
| MgO | 1.2 | 1.2 | 1.2 | 1.1 | 1.2 | 1.1 | 1.2 | | 1.1 | 1.1 | 1.1 | 1.1 | 1.1 | 1.1 | 1.0 | 1.0 |
| $B_2O_3$ | 6.6 | 6.6 | 6.6 | 6.4 | 6.5 | 6.4 | 9.6 | 9.1 | 6.4 | 6.5 | 6.5 | 6.5 | 6.5 | 5.5 | 6.3 | 5.3 |
| $K_2O$ | 3.4 | 3.4 | 3.4 | 3.3 | 3.4 | 3.3 | 3.4 | 3.2 | 3.4 | 2.8 | 2.8 | 1.9 | 2.8 | 2.8 | 3.2 | 2.6 |
| BaO | 4.5 | 4.5 | 4.5 | 8.7 | 6.6 | 8.7 | 4.4 | 12.5 | 8.7 | 6.6 | 4.5 | 8.6 | 6.6 | 6.6 | 4.9 | 6.7 |
| $P_2O_5$ | 4.1 | 4.1 | 4.1 | 4.1 | 4.1 | 4.1 | 4.1 | 3.9 | 4.0 | 4.1 | 5.0 | 6.0 | 4.1 | 4.1 | 3.6 | 4.0 |
| NiO | | | | | | | | | 0.1 | 0.1 | | | | | | |
| $Li_2O$ | | | | | | | | | | | | | | | | |
| ZnO | | | | | | | | | | | | | | | | |
| F | 2.15 | 2.15 | 2.15 | 2.15 | 2.15 | 2.15 | 2.15 | 2.5 | 2.1 | 2.1 | 2.1 | 2.1 | 2.1 | 2.1 | 1.6 | 1.3 |

| | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| $SiO_2$ | 59.1 | 59.1 | 57.2 | 60.9 | 61.0 | 59.4 | 60.4 | 60.9 | 59.0 | 60.1 | 58.5 | 61.5 | 63.0 | 58.4 | 60.8 | 60.8 |
| $Al_2O_3$ | 11.7 | 13.5 | 12.8 | 11.8 | 8.8 | 8.8 | 8.9 | 8.9 | 8.9 | 8.8 | 8.9 | 8.9 | 8.7 | 8.8 | 8.8 | 8.8 |
| $Na_2O$ | 5.8 | 7.3 | 6.9 | 6.4 | 4.9 | 4.9 | 5.0 | 5.0 | 5.0 | 5.0 | 5.0 | 5.0 | 4.9 | 4.9 | 4.9 | 4.9 |
| CaO | 1.6 | 3.3 | 1.6 | 3.3 | 1.6 | 3.1 | 1.6 | 1.6 | 3.2 | 1.6 | 3.2 | 0.9 | 0.9 | 3.2 | 1.6 | 1.6 |
| MgO | 1.2 | 1.2 | 1.1 | 1.1 | 1.1 | 1.1 | 1.1 | 1.1 | 1.1 | 1.1 | 1.1 | 1.0 | 0.9 | 1.1 | 1.1 | 1.1 |
| $B_2O_3$ | 6.5 | 5.6 | 5.4 | 5.7 | 6.4 | 6.4 | 6.5 | 6.5 | 6.5 | 6.5 | 6.5 | 6.3 | 6.3 | 6.4 | 6.4 | 6.4 |
| $K_2O$ | 3.4 | 3.6 | 3.4 | 3.6 | 2.7 | 2.7 | 2.8 | 2.8 | 2.8 | 2.8 | 2.8 | 2.8 | 2.8 | 2.7 | 2.7 | 2.7 |
| BaO | 4.4 | | 4.4 | | 6.4 | 6.4 | 6.6 | 6.6 | 6.6 | 6.6 | 6.6 | 7.1 | 7.0 | 6.4 | 6.4 | 6.4 |
| $P_2O_5$ | 4.1 | 4.2 | 4.1 | 4.1 | 4.1 | 4.1 | 4.1 | 4.1 | 4.1 | 4.1 | 4.1 | 4.5 | 3.9 | 4.0 | 4.0 | 4.0 |
| NiO | | | | | | | | | | 0.07 | 0.05 | 0.02 | — | — | — | — |
| $Li_2O$ | | | 1.0 | 1.0 | 1.0 | 1.0 | 0.75 | 0.25 | 0.5 | 1.0 | 1.0 | | | — | 0.8 | 0.4 |
| ZnO | | | | | | | | | | | | | | 2.0 | 0.2 | 0.6 |
| F | 2.15 | 2.15 | 2.15 | 2.15 | 2.15 | 2.15 | 2.2 | 2.2 | 2.2 | 2.2 | 2.2 | 2.0 | 1.6 | 2.15 | 2.2 | 2.2 |

No. 28 and 29 compositions are analysed results and have measured softening points of 796° C. and 812° C., respectively.

Table II records additional inventive glass compositions, as well as softening points in terms of °C., anneal points, density, strain, coefficients of thermal expansion (CTE) over the temperature range of 25°–300° C. expressed in terms of ×10⁻⁷/°C., and the emulsion liquidus temperature of the various samples tested.

TABLE II

| | 1 | 2 | 3 | 4 | 5 | 6 | 7 | 8 |
|---|---|---|---|---|---|---|---|---|
| $SiO_2$ | 60.9 | 62.91 | 61.01 | 63.51 | 62.9 | 62.43 | 62.15 | 62.7 |
| $Al_2O_3$ | 9.6 | 8.6 | 8.8 | 9.2 | 8.8 | 8.9 | 8.9 | 9.9 |
| $Na_2O$ | 7.2 | 7.0 | 5.4 | 4.7 | 5.8 | 5.8 | 6.0 | 5.7 |
| CaO | 1.7 | 1.6 | | 1.9 | 0.8 | 0.8 | 0.8 | 0.8 |
| MgO | 1.0 | 1.0 | 0.9 | 0.9 | 1.0 | 1.0 | 1.0 | 1.0 |
| $B_2O_3$ | 6.3 | 6.2 | 6.3 | 6.3 | 6.3 | 6.3 | 6.2 | 5.3 |
| $K_2O$ | 3.2 | 2.2 | 3.2 | 2.6 | 3.0 | 3.1 | 3.1 | 2.6 |
| $P_2O_5$ | 3.6 | 4.4 | 3.5 | 3.7 | 3.6 | 3.6 | 3.7 | 4.0 |
| BaO | 4.9 | 4.5 | 8.6 | 6.4 | 6.4 | 6.5 | 6.6 | 6.7 |
| F | 1.6 | 1.5 | 2.2 | 0.7 | 1.4 | 1.5 | 1.5 | 1.3 |
| NiO | | 0.09 | 0.09 | 0.09 | | 0.07 | 0.05 | |
| $Li_2O$ | | | | | | | | |
| Softening | 760 | | 767 | 832 | 777 | | 775 | 829 |
| Anneal | 548 | 548 | 527 | 575 | 543 | 538 | 538 | 551 |
| Strain | 509 | 510 | 483 | 533 | 500 | 497 | 495 | 505 |
| CTE | 72.6 | 71.5 | 65.3 | 62 | 66.1 | 66.9 | 67.6 | 66 |
| Density | 2.46 | 2.45 | 2.49 | 2.46 | 2.47 | 2.47 | 2.46 | 2.46 |
| Viscosity | | | | | Temperature | | | |
| 1000 | 1330 | 1350 | 1365 | 1443 | 1385 | 1379 | 1374 | 1435 |
| 10000 | 1159 | 1182 | 1188 | 1275 | 1200 | 1190 | 1198 | 1269 |
| 100000 | 1017 | 1037 | 1047 | 1137 | 1055 | 1053 | 1055 | 1115 |
| 1000000 | 902 | 917 | 930 | 1003 | 940 | 932 | 933 | 991 |

| | 9 | 10 | 11 | 12 | 13 | 14 | 15 | 16 |
|---|---|---|---|---|---|---|---|---|
| $SiO_2$ | 63.8 | 63.08 | 64.4 | 60.9 | 63.5 | 62.7 | 62.8 | 62.5 |
| $Al_2O_3$ | 8.8 | 9.2 | 9.2 | 9.7 | 9.6 | 9.7 | 9.5 | 9.0 |
| $Na_2O$ | 4.9 | 4.9 | 5.1 | 5.0 | 4.3 | 4.5 | 4.5 | 4.8 |
| CaO | 0.8 | 0.7 | 1.4 | 1.6 | 1.5 | 1.4 | 1.3 | 1.7 |
| MgO | 0.9 | 0.7 | 0.8 | 0.7 | 1.0 | 0.8 | 0.9 | 1.2 |
| $B_2O_3$ | 6.3 | 6.3 | 6.0 | 6.4 | 5.4 | 6.3 | 6.3 | 5.7 |
| $K_2O$ | 2.8 | 2.7 | 2.7 | 2.5 | 2.5 | 2.8 | 2.7 | 2.6 |
| $P_2O_5$ | 3.6 | 4.2 | 3.7 | 4.1 | 4.0 | 3.7 | 3.8 | 4.0 |
| BaO | 6.5 | 6.0 | 4.8 | 6.5 | 6.2 | 6.0 | 5.8 | 6.6 |

TABLE II-continued

| | | | | | | | | |
|---|---|---|---|---|---|---|---|---|
| F | 1.6 | 2.2 | 1.9 | 1.7 | 1.0 | 1.8 | 2.0 | 0.9 |
| NiO | | 0.02 | | | | | | |
| $Li_2O$ | | | | 0.9 | 1.0 | 0.3 | 0.4 | 1.0 |
| Softening | 795 | 788 | | 760 | | | | |
| Anneal | 532 | 519 | 527 | 519 | 543 | 532 | 527 | 554 |
| Strain | 489 | 473 | 478 | 472 | 503 | 485 | 480 | 516 |
| CTE | 62.5 | 63.5 | 62.8 | 65.2 | 64.4 | 61.6 | 62.8 | 64.4 |
| Density | 2.45 | 2.44 | 2.43 | 2.47 | 2.47 | 2.45 | 2.45 | 2.5 |
| Viscosity | | | Temperature | | | | | |
| 1000 | 1425 | 1428 | 1436 | 1356 | | | | |
| 10000 | 1246 | 1232 | 1260 | 1189 | | | | |
| 100000 | 1094 | 1070 | 1110 | 1045 | | | | |
| 1000000 | 970 | 949 | 976 | 922 | | | | |

Samples of several glasses were screened for potential weathering problems by boiling in distilled water for one hour and analyzing the water for $Na_2O$ content. Where less than 4 µg $Na_2O/cm^2$ were extracted (Ext.) from the specimens, the glass was considered to be desirably resistant to weathering.

Detergent resistance (D.R.) was investigated via immersing specimens of the glasses into a 0.3% aqueous solution of SUPER SOILAX® brand detergent, marketed by Economics Laboratories, St. Paul, Minn., operating at 95° C. for periods of 24, 48, 72, and 96 hours. An exposure of 96 hours has been estimated to be equivalent to about 10 years of use in a household dishwasher in an average home. The surface areas of the specimens were limited to a ratio of 12 square inches of glass to one pound of the solution. The samples were removed periodically from the hot solution, rinsed in tap water, and wiped dry. Thereafter, a portion of each specimen was coated with DYE-CHEK® brand dye penetrant, marketed by Magna-Flux Corporation, Chicago, Ill., the dye permitted to remain in contact therewith for 20 seconds, and the sample then wiped dry.

Examples 1 through 16 of Table II represent the preferred compositions since they exhibit high emulsion liquidus, relatively high softening points, relatively low coefficients of thermal expansion, and are entirely free from crystallization; with Examples 12 through 16 representing the more preferred glass compositions because they are more opaque and whiter than the glasses of Examples 1–11. It is believed that the high opacity of the glasses of Examples 12–16 is due to greater phase separation. The most preferred glass compositions are represented by Examples 12 and 13.

Table III represents the target glass composition of the invention.

TABLE III

| Element | Target (Wt. %) |
|---|---|
| $Al_2O_3$ | 8.80% +/− 0.20% |
| BaO | 6.40% +/− 0.15% |
| $B_2O_3$ | 6.40% +/− 0.15% |
| CaO | 1.60% +/− 0.15% |
| F | 1.70% +/− 0.15% |
| $K_2O$ | 2.70% +/− 0.15% |
| $Li_2O$ | 1.00% +/− 0.05% |
| MgO | 1.10% +/− 0.15% |
| $Na_2O$ | 4.90% +/− 0.15% |
| $P_2O_5$ | 4.00% +/− 0.15% |
| $SiO_2$ | Balance |

It will be appreciated that where desired, conventional glass colorants, such as CoO, $Cr_2O_3$, CuO, $Fe_2O_3$, $MnO_2$, NiO, and $V_2O_5$, may be incorporated into the base glass composition in quantities customary in the glass art, normally less than 5% by weight.

We claim:

1. A spontaneous, non-crystalline opal glass exhibiting a very dense, milky-white appearance, a softening point in excess of 700° C., a coefficient of thermal expansion (25°–300° C.) between about 65–85×10$^{-7}$/°C., a density of at least 2.4 g/cm$^3$, an opal liquidus no higher than 1200° C., and excellent resistance to weathering and attack by alkaline detergents consisting essentially, expressed in terms of weight percent on the oxide basis as calculated from the batch, of 1.9–3.6% $K_2O$, 4.2–7.3% $Na_2O$, 0.2–3.0.% $Li_2O$, 0–1.2% MgO, 0–4.9% CaO, 0–12.5% BaO, 0–0.1% NiO, 0–4% ZnO 5.3–9.6% $B_2O_3$, 8.8–13.5% $Al_2O_3$, 57.2–64.4% $SiO_2$, 1–6% $P_2O_5$, and 1.0–2.2% F.

2. The opal glass according to claim 1, wherein the sum of MgO+CaO+BaO is in the range of 4.5 to 12.5 wt. %.

3. The opal glass according to claim 2, wherein the glass consists essentially, expressed in terms of weight percent on the oxide basis as calculated from the batch, of:

$Al_2O_3$ 8.6–9.0
BaO 6.25–6.65
$B_2O_3$ 6.25–6.665
CaO 1.45–1.75
F 1.55–1.85
$K_2O$) 2.55–2.85
$Li_2O$ 0.95–1.5
MgO 0.95–1.25
$Na_2O$ 4.75–5.05
$P_2O_5$ 3.85–4.15
$SiO_2$ balance.

4. The opal glass according to claim 1, wherein the glass contains at least 0.4% ZnO.

* * * * *

UNITED STATES PATENT AND TRADEMARK OFFICE
CERTIFICATE OF CORRECTION

PATENT NO. : 5,591,683
DATED : January 7, 1997
INVENTOR(S) : John L. Stempin, et. al.

It is certified that error appears in the above-indentified patent and that said Letters Patent is hereby corrected as shown below:

Claim 3, lines 49, 53 and 54
"$B_2O_3$ 6.25-6.665" should read
--$B_2O_3$ 6.25-6.65--;

"$K_2O$) 2.55-2.85" should read
--$K_2O$ 2.55-2.85--;

"$Li_2O$ 0.95-1.5" should read
--$Li_2O$ 0.95-1.05--.

Abstract
"percent on the on the basis"
should read --percent on the oxide basis--.

Column 1, line 29, "3,723, 144"
should read --3,723,144--.

Column 1, line 50, "$Al_2O_3$ 57.2-64.4% $SIO_2$" should read --$Al_2O_3$ 57.2-64.4%, $SiO_2$--.

Column 1, line 51, "1.0-2.2% F.,"
should read --1.0-2.2% F,--.

Column 2, line 14, "57.2-64.4% $SIO_2$"
should read --57.2-64.4% $SiO_2$--.

Column 2, line 19, "fiuorophosphate"
should read --fluorophosphate--.

Column 2, line 50, "1.0-2,2% F.,"
should read --1.0-2.2% F,--.

Column 2, line 66, "amounts off"
should read --amounts of F--.

UNITED STATES PATENT AND TRADEMARK OFFICE
CERTIFICATE OF CORRECTION

PATENT NO. : 5,591,683
DATED : January 7, 1997
INVENTOR(S) : John L. STEMPIN and Dale R. WEXELL It is certified that error appears in the above-indentified patent and that said Letters Patent is hereby corrected as shown below:

Column 3, line 25, "BaO, and $SIO_2$" should read --BaO, and $SiO_2$--.   Page 4, line 23

Column 3, line 41, "$Na_{20}$" should read --$Na_2O$--.   Page 5, line 3

Signed and Sealed this

Eighth Day of April, 1997

Attest:

BRUCE LEHMAN

Attesting Officer         Commissioner of Patents and Trademarks